United States Patent
Tepass et al.

(10) Patent No.: US 8,639,977 B2
(45) Date of Patent: Jan. 28, 2014

(54) CONTROL DEVICE

(75) Inventors: Bernd Tepass, Beilstein (DE); Bernd Nottebom, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 845 days.

(21) Appl. No.: 12/224,409

(22) PCT Filed: Feb. 9, 2007

(86) PCT No.: PCT/EP2007/051261
§ 371 (c)(1),
(2), (4) Date: Sep. 28, 2011

(87) PCT Pub. No.: WO2007/099023
PCT Pub. Date: Sep. 7, 2007

(65) Prior Publication Data
US 2012/0017113 A1      Jan. 19, 2012

(30) Foreign Application Priority Data
Mar. 2, 2006   (DE) .......................... 10 2006 009 658

(51) Int. Cl.
*G06F 11/00*      (2006.01)
(52) U.S. Cl.
USPC .............................................. 714/23; 714/10
(58) Field of Classification Search
USPC ........ 714/10, 23, 747; 701/39, 43, 62, 63, 76, 701/92, 97, 107
See application file for complete search history.

(56) References Cited

U.S. PATENT DOCUMENTS

| | | | | |
|---|---|---|---|---|
| 4,554,461 A * | 11/1985 | Oho et al. | ........................ | 307/40 |
| 4,598,355 A * | 7/1986 | Shepler et al. | ................... | 700/79 |
| 5,259,473 A * | 11/1993 | Nishimoto | ..................... | 180/446 |
| 5,450,403 A * | 9/1995 | Ichii et al. | ...................... | 370/216 |
| 6,139,468 A * | 10/2000 | Goates et al. | ................... | 477/97 |
| 6,341,239 B1* | 1/2002 | Hayashi et al. | .................. | 700/79 |
| 6,928,346 B2* | 8/2005 | Gross et al. | ................... | 701/29.1 |
| 7,213,168 B2* | 5/2007 | Kalan et a | ........................ | 714/11 |
| 2003/0083802 A1* | 5/2003 | Miyano | .......................... | 701/114 |
| 2003/0088358 A1* | 5/2003 | Takeuchi | ....................... | 701/114 |
| 2004/0225418 A1* | 11/2004 | Barrenscheen et al. | ........... | 701/1 |
| 2009/0132061 A1* | 5/2009 | Stubbs et al. | ...................... | 700/8 |

FOREIGN PATENT DOCUMENTS

| | | |
|---|---|---|
| DE | 197 33 748 | 2/1999 |
| DE | 102 28 905 | 1/2004 |
| EP | 0 113 478 | 7/1984 |
| EP | 0 399 491 | 11/1990 |
| FR | 2 726 675 | 5/1996 |

\* cited by examiner

*Primary Examiner* — Marc Duncan
(74) *Attorney, Agent, or Firm* — Kenyon & Kenyon LLP

(57) ABSTRACT

The control device has a receiving device, an output stage, a checking device and a reset device. The receiving device is used to receive at least one data block including control commands from a data bus, the output stage is used to output an output signal in response to the control commands, the checking device is used to output an error signal if the at least one received data block is faulty and/or if no data block is received within a predetermined time, and the reset device is used to reset the output stage in a predefined state if the checking device outputs the error signal. The control device is thus able to react automatically to faultily transmitted data blocks without having to wait for return messages from a transmitting central processor unit.

13 Claims, 1 Drawing Sheet

CONTROL DEVICE

FIELD OF THE INVENTION

The present invention relates to a control device, in particular a final stage device of a motor vehicle control unit.

BACKGROUND INFORMATION

In motor vehicles, various processes are controlled by microprocessors. Typically, however, the microprocessors output signals at low levels. The devices to be controlled, however, sometimes require large currents or high voltages. A transformation of the low signal levels to the higher signal levels is achieved by final stages. Expediently, the final stages are situated in spatial proximity to the devices to be controlled. On the other hand, it proves expedient to situate the controlling microprocessors at one or a few central locations in the motor vehicle. The signals are expediently transmitted between the microprocessor and a final stage via a unidirectional data transmission link. Such a data transmission link is described e.g. in German Patent Application Nos. DE 19733748 and DE 10228905.

Various electrical interference fields exist in the vehicle, which may falsify the signal to be transmitted during the transmission. A mechanism for detecting a faulty transmission on the side of the final stage makes use of redundant data that are transmitted along with the signal. The final stage is then able to determine on the basis of the cross sum or parity of the transmitting signal whether a faulty transmission occurred or whether the integrity of the transmitting data block is preserved.

The data transmission between the microprocessor and the final stage occurs at a high data transmission rate. In the event of a faulty transmission it is not expedient to stop the transmission and to resend the faultily transmitted data block. On this matter, German Patent Application No. DE 19733748 provides for the transmission to be continued even in the event of a faulty transmission of an individual data block. In this case, the final stage is to retain the previously set output state until the next correct transmission of a data block occurs.

This method and the associated device result in faulty behavior in some of the devices to be controlled since high signal levels may be applied on them for too long.

SUMMARY OF THE INVENTION

With respect to the related art, the control device according to the present invention or the method according to the present invention have the advantage that even in the event of a faulty data transmission no unacceptably long signal levels are applied on the output of the control device.

The control device according to the present invention has a receiving device, an output stage, a checking device and a reset device. The receiving device is used to receive at least one data block comprising control commands from a data bus, the output stage is used to output an output signal in response to the control commands, the checking device is used to output an error signal if the at least one received data block is faulty and/or if no data block is received within a predetermined time, and the reset device is used to reset the output stage in a predefined state if the checking device outputs the error signal.

The predefined state is selected in such a way that at least the outputs having a possibly critical signal level are set to a low signal level. For this purpose, the predefined state may also be selected by taking into account the signal level currently applied on the output stage.

The output stage may have a single output line having an associated output signal or a plurality of such output lines.

The checking device checks the data block using a plausibility check, e.g. with the aid of redundant data such as parity bits. The predetermined time may be selected according to the clock rate of the utilized transmission channel.

The receiving device may be set up to receive data blocks from a microsecond bus, into which e.g. a microprocessor feeds its control signals. In the event of a faultily received data block it may be advantageous to output the error signal via a return channel through an output device.

Furthermore, the control device may have an integrated data memory that is set up to store the predefined states.

The method according to the present invention provides for data blocks comprising control commands to be received via a data bus, for output signals of an output stage to be established in accordance with the control commands, for the integrity of the received data block to be checked using a checking device, and for the output stage to be reset in a predefined state if it is established that the integrity of the received data block is not provided.

DETAILED DESCRIPTION

Figure 1:
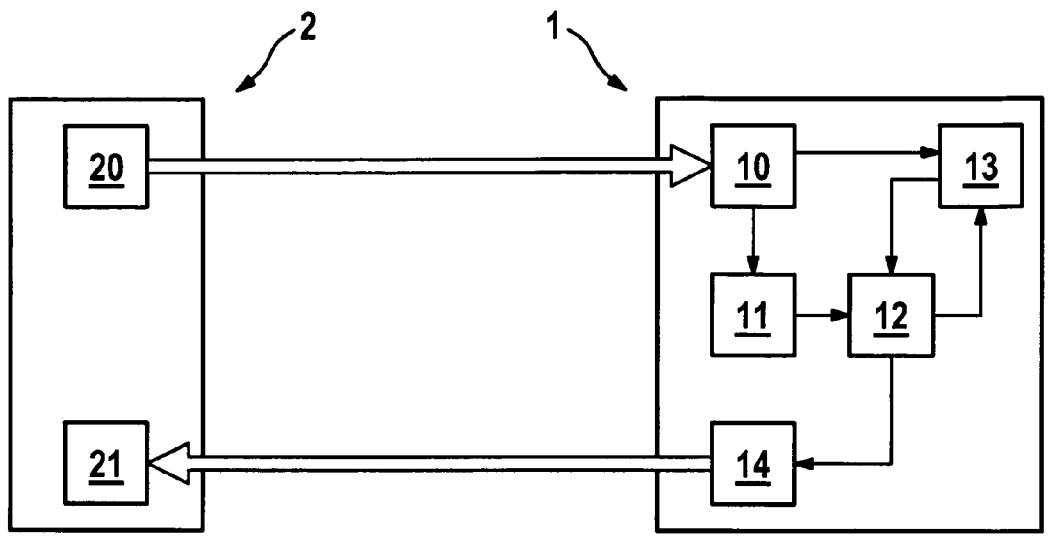
FIG. 1 shows a schematic block diagram of an execution device that is connected to a microprocessor.

FIG. 1 shows a microprocessor 2 and at least one final stage 1, e.g. of a motor vehicle control device. Microprocessor 2 has an output interface 20. The output interface is able to output the control commands in parallel. If the number of physical transmission lines is to be kept as low as possible, a serial data transmission is more expedient. The data are split up into individual data blocks in accordance with a predetermined data transmission protocol and are transmitted. Such a data transmission protocol may be e.g. a microsecond bus protocol.

Final stage 1 has a receiving device 10 corresponding to the selected transmission protocol. The transmission between output interface 20 and receiving device 10 of final stage 1 is unidirectional. The output interface is thus designed as a pure output and the input device as a pure input. This keeps the expenditure for implementing these devices low in comparison to a bidirectional communication and the devices required for the latter.

Receiving device 10 is connected internally in final stage 1 to output stage 13. Output stage 13 is typically a common amplifier circuit. The output signal of the output stage is applied on a device to be controlled, e.g. a valve.

Receiving device 10 at the same time transmits the received data packet to a checking device 11. This checking device 11 determines whether the received data packet was falsified during the transmission, i.e. whether the integrity of the data packet was not maintained.

Various checking methods may be used for this purpose. One possibility is to transmit redundant data in addition to the data packet. A redundant datum may be e.g. the cross sum of the data block. Another possibility is to transmit also a so-called parity bit that indicates the parity of the data block. If the monitoring device determines that the data transmission is faulty, monitoring device 11 outputs an error signal. This error signal controls a reset device 12, which outputs a predetermined state that is stored within it to output stage 13. Output stage 13 reads in the predetermined state and applies a signal level on its output as output signal, which corresponds to this predetermined state, in place of the faultily transmitted data block.

If individual data packets are not transmitted or none are transmitted at all, then this is in principle also a faulty data transmission. Checking mechanisms also detect such an absence of the data packets.

Monitoring device 11 may transmit the error signal or a monitoring signal corresponding to the error signal via an output device 14 and a return channel to microprocessor 2 or another device.

One variant of the preceding exemplary embodiment has a reset device 12 having a data memory in which more than only one predetermined state is stored. The selection of the predetermined state to be output depends on the state or the output signal of output stage 13.

Output stage device 13 may have multiple individual output stages. An individual bit or a group of bits of the data block may be assigned to the individual output stages. Another possibility is to address the individual output stages one after another sequentially by consecutive data blocks.

Figure 2:
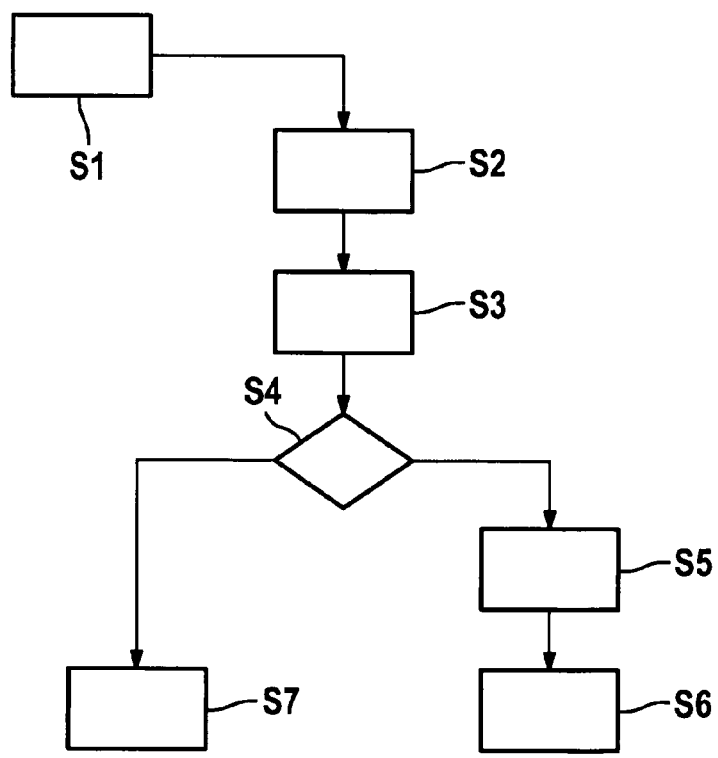
FIG. 2 shows a flow chart of a specific embodiment for operating the control device in FIG. 1.

FIG. 2 describes the sequence of an exemplary embodiment schematically as a flow chart. Data blocks are transmitted sequentially by the microprocessor or the control device. After a single such data block is transmitted (S1), it is received by the receiving device of the final stage (S2). The checking device checks the integrity of the data block (S3). If the check reveals that the data block is faulty (S4), then the final stage is set to a predefined state (S5). The final stage then outputs an output signal that corresponds to the predefined state (S6). If the check of the received data block reveals that the latter was transmitted correctly, then the output stage of the final stage outputs an output signal corresponding to the data block (S7).

What is claimed is:

1. A control device comprising:
   a receiving device for receiving at least one data block including control commands from a data bus;
   an output stage for outputting an output signal in response to the control commands;
   a checking device for outputting an error signal if no data block is received within a predetermined amount of time; and
   a reset device for resetting the output stage to a predefined state if the checking device outputs the error signal.

2. The control device according to claim 1, wherein the control device is a final stage device of a motor vehicle control device.

3. The control device according to claim 1, wherein the receiving device receives data blocks from a microsecond bus.

4. The control device according to claim 1, further comprising an output device for outputting the error signal to a return channel.

5. The control device according to claim 1, wherein the reset device includes an integrated data memory in which the predefined state is stored.

6. The control device according to claim 1, wherein the control device is integrated in one unit.

7. The control device according to claim 1, wherein the resetting of the output stage is for the output stage to set the output signal to a predefined output signal state, the output signal being output while set to the predefined state if the checking device outputs the error signal.

8. The control device according to claim 7, wherein the output signal, when set to the predefined output signal state, is of a signal level below a critical signal level at which a process controlled by the control device is triggerable.

9. A method for controlling a control device comprising:
   receiving data blocks including control commands via a data bus;
   checking, by a checking device, for a reception of a data block within a predetermined time interval, the checking resulting in a determined error if no data block is received within a predetermined amount of time; and
   resetting an output stage, that is adapted for outputting an output signal in response to the control commands, to a predefined state if the error is determined in the checking step.

10. The method according to claim 9, further comprising loading the predefined state in a reset from a database of the control device that is integrated in the control device.

11. The method according to claim 9, further comprising outputting an error signal in the event of a lack of integrity of the received data blocks via a return channel to a data processing device that sends the data blocks.

12. The method according to claim 9, wherein the output signal of the output stage is defined, prior to the check, in accordance with the control commands.

13. A control device comprising:
    a device for receiving at least one data block including control commands from a data bus;
    an output stage for outputting an output signal in response to the control commands; and
    a checking device for producing an error result if no data block is received within a predetermined amount of time;
    wherein the output stage includes a reset device, storing a predefined output signal state, for:
       resetting the output stage to a state in which to set the output signal being output to correspond to the predefined state responsive to a determination that the error has occurred; and
       setting the output signal being output to correspond to the control commands absent a determination that the error has occurred.

* * * * *

UNITED STATES PATENT AND TRADEMARK OFFICE
CERTIFICATE OF CORRECTION

PATENT NO.      : 8,639,977 B2                                    Page 1 of 1
APPLICATION NO. : 12/224409
DATED           : January 28, 2014
INVENTOR(S)     : Tepass et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1515 days.

Signed and Sealed this
Twenty-second Day of September, 2015

Michelle K. Lee
*Director of the United States Patent and Trademark Office*